UNITED STATES PATENT OFFICE.

CLAYTON W. BEDFORD AND ROBERT L. SIBLEY, OF AKRON, OHIO, ASSIGNORS TO THE GOODYEAR TIRE & RUBBER COMPANY, OF AKRON, OHIO, A CORPORATION OF OHIO.

VULCANIZING CAOUTCHOUC.

1,406,717.     Specification of Letters Patent.     Patented Feb. 14, 1922.

No Drawing.     Application filed August 12, 1918. Serial No. 249,579.

*To all whom it may concern:*

Be it known that we, CLAYTON W. BEDFORD and ROBERT L. SIBLEY, citizens of the United States, residing at Akron, in the county of Summit and State of Ohio, have invented a new and useful Improvement in Vulcanizing Caoutchouc, of which the following is a specification.

The present invention relates to the art of vulcanizing caoutchouc and will be fully understood from the following specification:

The organic substance paranitroso-dimethyl-aniline has heretofore been employed as an accelerator in the process of vulcanizing caoutchouc. We have discovered that this substance, in neutral solutions both aqueous and non-aqueous, and in fact in any suitable inactive organic solvent, such as benzol ($C_6H_6$), will re-act quantitatively with hydrogen sulphide to produce a compound having strong basic properties and forming a valuable accelerator for vulcanization.

The strong basic properties of the product and the fact that it contains a basic nitrogen group is evidenced by its violent reaction with carbon bisulphide to produce a substituted thiourea with a corresponding loss of $H_2S$. The amido compounds in general react rather slowly with carbon bisulphide and the corresponding thioureas are usually produced commercially by the aid of catalysts such as sulphur, pyridine, etc., which aid in removal of the $H_2S$ from the reaction. With a strong base such as piperidine, however, reaction with $CS_2$ proceeds with extreme violence without the necessity for any catalysts, the reaction mixture becoming hot. The base which we produce appears to correspond to the order of piperidine, in so far as its strong basicity is concerned, as shown by its violent reaction with carbon bisulphide ($CS_2$), with accompanying violent evolution of hydrogen sulphide and the heating up of the reaction mixture.

We have found that this base constituting the reaction product of hydrogen sulphide and paranitroso-dimethyl-aniline is a valuable accelerator, being particularly superior in this use to paranitroso-dimethyl-aniline itself, in that it is more stable in storage and is not as active a poison within the limits of its use in the vulcanization of rubber.

In the practice of our invention we may proceed as follows:

Example: One molecular weight (150 parts) of paranitroso-dimethyl-aniline is dissolved in benzol or in water, and hydrogen sulphide is passed into and dissolved by the solution at any temperature up to the boiling point of the solvent until no more will react. The green color of the paranitroso-dimethyl-aniline disappears and there is produced a base which is dark in color and often of a tarry consistency. On evaporation of the solvent and of the water formed in the reaction the weight of the paranitroso-dimethyl-aniline will be found to have increased by an amount substantially equivalent to the difference between the molecular weight of hydrogen sulphide and that of water, apparently corresponding to the following equation:

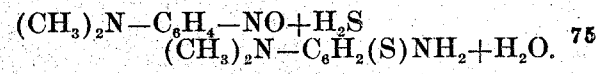

We have therefore found that under certain conditions the reaction proceeds as shown in the foregoing, i. e., 1 molecule paranitroso-dimethyl-aniline plus 1 molecule hydrogen sulphide gives 1 molecule of water plus 1 molecule of a strong base.

By varying the conditions of the reaction, entirely different results may be obtained as follows:—1 molecule of paranitroso-dimethyl-aniline plus two molecules of hydrogen sulphide gives 1 molecule of water plus two atoms of sulphur plus 1 molecule of a strong base which is probably para amido dimethyl-aniline.

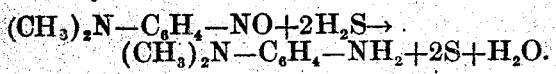

In the first of the above examples, para-amido-dimethyl-aniline is apparently not formed but in its place a compound similar in constitution and basic properties but apparently containing a sulphur atom in its structural make-up.

We have discovered therefore a new method of preparing a base by the reaction of less than two mols of hydrogen sulphide on one mol of paranitroso-dimethyl-aniline, and its use as an accelerator. A small percentage of this base is added to caoutchouc (for example in the proportion of one-half to two per cent of the weight of the latter) and the whole then heated with a vulcanizing agent in the usual way to effect vulcanization. The base exerts a marked beneficial influence on the vulcanizing process, giving a vulcanized product of superior quality.

Similar products, likewise useful for the vulcanization of caoutchouc may be produced by the reaction of hydrogen sulphide on other paranitroso bodies, such, for example, as paranitroso-phenol.

While we have in the foregoing described in detail one manner of carrying out our invention, together with our theories as to the nature of the reactions which take place, and the characteristics of the products, it will be understood that this is illustrative only, and for the purpose of making the invention more clear, and that the invention is not limited to the procedure mentioned, nor dependent upon the accuracy of the theories which we have advanced, except in so far as such limitations are included within the terms of the accompanying claims, in which it is our intention to claim all novelty inherent in our invention as broadly as is permissible in view of the prior art.

What we claim is:

1. The process which consists in incorporating a small percentage of the reaction products of paranitroso dimethylaniline with less than two molecules of hydrogen sulfide into a caoutchouc mixture and heating with a vulcanizing agent.

2. The process which consists in incorporating a small percentage of the reaction products of paranitroso dimethylaniline with one molecule of hydrogen sulfide into a caoutchouc mixture and heating with a vulcanizing agent.

3. The process which consists in incorporating a small percentage of a reaction products of paranitroso dimethylaniline with hydrogen sulfide having an ultimate composition corresponding approximately to the formula $(CH_3)_2N.C_6H_2(S)NH_2$ into a caoutchouc mixture, and heating with a vulcanizing agent.

4. The process which consists in incorporating into a rubber mix a small percentage of the reaction products of one mol of a paranitroso body with less than 2 mols of hydrogen sulphide and heating with a vulcanizing agent.

5. The process which consists in incorporating into a rubber mix a small percentage of the reaction products of one mol of a paranitroso body with one mol of hydrogen sulphide and heating with a vulcanizing agent.

6. The process which consists in incorporating a small percentage of the reaction products of paranitroso-dimethyl-aniline in solution in an inactive neutral solvent with hydrogen sulphide into a caoutchouc mixture and heating with a vulcanizing agent.

7. The process which consists in incorporating into a caoutchouc mixture the reaction products of one mol of paranitro-dimethylaniline in solution in an inactive neutral solvent with less than two mols of hydrogen sulphide and heating with a vulcanizing agent.

8. The process which consists in incorporating into a caoutchouc mixture the reaction products of one mol of paranitro-dimethylaniline in solution in an inactive neutral solvent with one mol of hydrogen sulphide and heating with a vulcanizing agent.

CLAYTON W. BEDFORD.
ROBERT L. SIBLEY.